United States Patent [19]
Klein

[11] Patent Number: 6,152,592
[45] Date of Patent: Nov. 28, 2000

[54] MIXING DEVICES HAVING AN ARRAY OF SPACED APART MIXING ELEMENTS FOR INTERCEPTING A FLOWING STREAM OF MATERIAL AND CONTOURED TO MIX CONSTITUENTS IN THE STREAM

[76] Inventor: Ron J. Klein, 7 Victoria Way, Kendall Park, N.J. 08824

[21] Appl. No.: 09/252,251

[22] Filed: Feb. 18, 1999

[51] Int. Cl.$^7$ ............................... B01F 5/06; B29B 7/42
[52] U.S. Cl. ............................... 366/80; 366/81; 366/338
[58] Field of Search .......................... 366/79–81, 83–85, 366/87–90, 318, 319, 322, 324, 336–338; 425/204, 208, 209; 138/37, 39; 48/189.4

[56] References Cited

U.S. PATENT DOCUMENTS

| | | |
|---|---|---|
| 2,607,077 | 8/1952 | Dulmage . |
| 2,753,595 | 7/1956 | Dulmage . |
| 3,006,029 | 10/1961 | Saxton . |
| 3,076,637 | 2/1963 | Moziek et al. . |
| 3,652,064 | 3/1972 | Lehnen et al. . |
| 3,788,612 | 1/1974 | Dray . |
| 3,856,442 | 12/1974 | Gallagher et al. . |
| 3,957,256 | 5/1976 | Murakami ................................. 366/81 |
| 4,409,164 | 10/1983 | Brasz et al. . |
| 4,779,989 | 10/1988 | Barr ........................................... 366/90 |
| 4,842,414 | 6/1989 | Dray ......................................... 366/322 |
| 5,197,803 | 3/1993 | Wall et al. . |
| 5,318,357 | 6/1994 | Colby et al. . |
| 5,567,370 | 10/1996 | Deseke et al. . |
| 5,798,077 | 8/1998 | Womer et al. ........................... 425/208 |
| 5,816,698 | 10/1998 | Durina et al. ............................. 366/81 |
| 5,941,637 | 8/1999 | Maurer .................................... 366/337 |

FOREIGN PATENT DOCUMENTS

| | | | |
|---|---|---|---|
| 56-5748 | 1/1981 | Japan ...................................... 366/81 |
| 5-228920 | 9/1993 | Japan ...................................... 366/81 |

*Primary Examiner*—Charles E. Cooley
*Attorney, Agent, or Firm*—Arthur Jacob

[57] ABSTRACT

A mixing device is placed in a stream of material flowing in a longitudinal direction for mixing constituents in the stream, the mixing device including a plurality of mixing elements spaced apart from one another and projecting transversely into the oncoming stream of material. The mixing elements are spaced laterally from one another and each mixing element has a cup-shaped upstream face for confronting the oncoming stream of material while allowing the stream of material to flow in the longitudinal direction, between the laterally spaced apart mixing elements, to effect enhanced mixing with lower shear.

20 Claims, 5 Drawing Sheets

MIXING DEVICES HAVING AN ARRAY OF SPACED APART MIXING ELEMENTS FOR INTERCEPTING A FLOWING STREAM OF MATERIAL AND CONTOURED TO MIX CONSTITUENTS IN THE STREAM

BACKGROUND OF THE INVENTION

1. Field of the Invention

The present invention relates generally to the mixing of constituents in a stream of material and pertains, more specifically, to mixing devices for placement in a stream of material to effect mixing of constituents in the stream with lower shear and higher efficiency.

The mixing of constituents in a stream of material very often is carried out as the stream flows along a conduit, such as in a screw-type pump assembly commonly employed in extrusion and injection molding applications, as well as in other pipes and pipe-like material transport conduits. For example, in the extrusion of synthetic polymeric materials, often two or more constituents are fed together to be mixed as the material is moved along in a stream through an extruder in which a shearing action between a rotating extrusion screw and the material, which accomplishes both melting and pumping of the material to deliver a melted stream of material, also is relied upon for mixing the constituents in the material. While such an extrusion process is considered to be an excellent process for high shear melting, the extrusion process is not regarded as a highly effective mixing process. In particular, where the constituents exhibit dramatically different viscosities, or where an attempt is made to mix small quantities of a constituent uniformly into a matrix of another constituent, extrusion processes have lacked effectiveness.

2. Description of the Related Art

Efforts to increase the effectiveness of mixing constituents in a stream of material in a plasticating extruder have led to an increase in the shear of the material in the stream. Devices which raise the shear in a stream of material do provide increased mixing; however, any such improvement in mixing is accomplished at the cost of higher shear and higher material exit temperatures, leading to deleterious degradation of some materials. Attempts at low shear mixing often result in merely splitting the material flow into multiple flow streams, rather than effecting thorough mixing, due to the absence of the turbulent action required for more effective mixing.

SUMMARY OF THE INVENTION

The present invention overcomes the disadvantages experienced by prior mixing arrangements by providing a high degree of uniformity in the mixing of constituents without excessive shearing of the material. As such, the present invention attains several objects and advantages, some of which are summarized as follows: Attains effective mixing of constituents in a stream of material without excessive shearing of the material; allows thorough mixing of constituents to be carried out in a stream of material without deleterious degradation of the material in the stream; provides a high degree of turbulence for effective mixing of constituents in a stream of material; enables ready adoption for use in current extrusion and injection molding apparatus, as well as other material transport conduits; provides a simple yet effective mixing device for use in a wide range of mixing applications, in both dynamic and static installations; accomplishes a high degree of mixing effectiveness with a simplified device of rugged construction for reliable use over a long service life.

The above objects and advantages, as well as further objects and advantages, are attained by the present invention which may be described briefly as a mixing device for placement at a mixing location in a stream of material for mixing constituents in the stream when the stream of material flows in a longitudinal direction along a conduit from an upstream location to a downstream location, the mixing location being placed in the conduit between the upstream location and the downstream location for intercepting an oncoming stream of material in the conduit, the mixing device comprising: a plurality of mixing elements arrayed in a field, the mixing elements being arranged in rows extending in lateral directions and spaced apart longitudinally along the field, the mixing elements projecting in altitudinal directions for being located in the conduit to extend transversely into the oncoming stream of material, each mixing element having: an upstream face for confronting the oncoming stream of material, the upstream face having a leading edge, a trailing edge, and a concave contour configuration extending between the leading edge and the trailing edge for intercepting the oncoming stream, the leading edge being located upstream of the trailing edge such that the oncoming stream is first intercepted adjacent the leading edge; and a plan configuration including a first leg extending in an essentially longitudinal direction, and a second leg extending in an essentially lateral direction, the first leg being located upstream of the second leg such that each element has an included surface extending along an included angle between the first and second legs and facing upstream, and an opposite surface extending along an external angle between the first and second legs and facing downstream, the concave contour configuration extending along the included surface.

BRIEF DESCRIPTION OF THE DRAWING

The invention will be understood more fully, while still further objects and advantages will become apparent, in the following detailed description of preferred embodiments of the invention illustrated in the accompanying drawing, in which.

DESCRIPTION OF THE PREFERRED EMBODIMENTS

Figure 1:
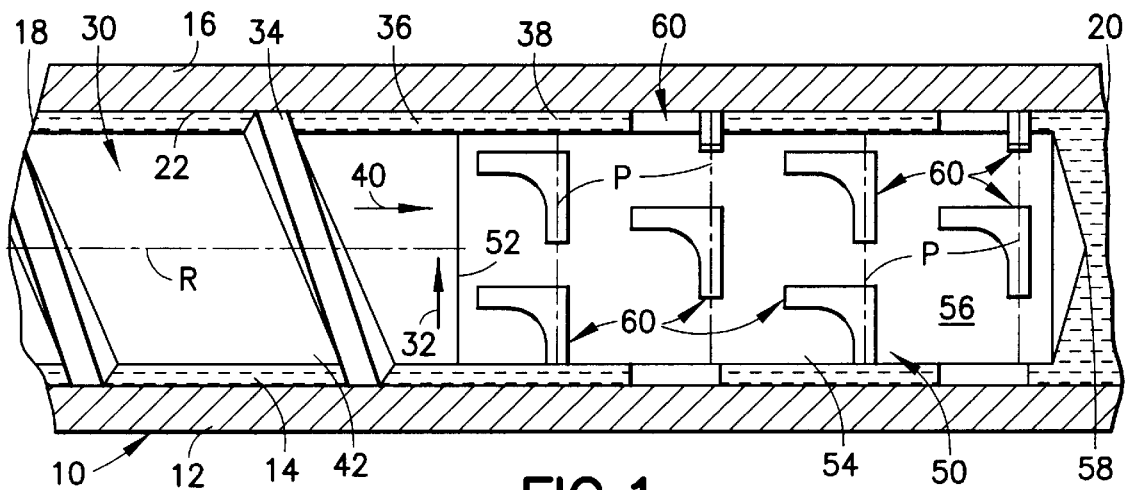
FIG. 1 is a largely diagrammatic fragmentary longitudinal cross-sectional view of a portion of a plasticating extruder showing the incorporation therein of a mixing device of the present invention.

Referring now to the drawing, and especially to FIG. 1 thereof, a portion of a plasticating extruder is shown at 10 and is seen to include a barrel 12 having a conduit in the form of a chamber 14 having a cylindrical chamber wall 16 extending longitudinally from an upstream location 18 to a downstream location 20 and including an interior surface 22. An extruder screw 30 is journaled for rotation within the chamber 14, in a direction of rotation 32 about a longitudinal axis of rotation R, and includes a flight 34 for moving a material 36 in a stream 38 through the chamber 14, in a longitudinal downstream direction 40 from the upstream location 18 toward the downstream location 20, the material 36 traveling along a channel 42 of the extruder screw 30 in a conventional manner.

Material 36 is comprised of constituents which are to be mixed together for delivery at an exit location further downstream of the downstream location 20. In order to accomplish thorough mixing of the constituents in the stream 38 of material 36, a mixing device 50, constructed in accordance with the present invention, is mounted upon the extruder screw 30, at downstream end 52 of the extruder screw 30, for rotation with the extruder screw 30. Mixing device 50 includes a basal member in the form of a hub 54 having an external cylindrical surface 56 extending axially from the end 52 of the extruder screw 30 to a remote end 58.

Figure 2:
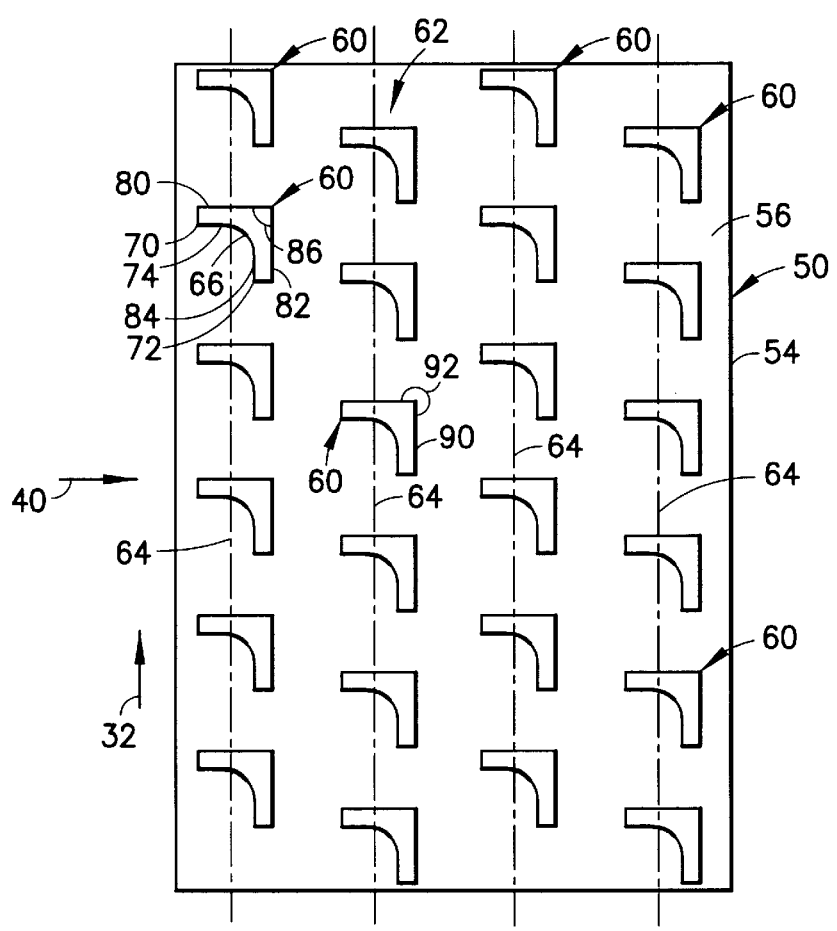
FIG. 2 is a schematic view of the working arrangement of the mixing device, unwrapped for illustration in plan along the plane of the paper.

A plurality of mixing elements in the form of members 60 project from the surface 56 in radial directions toward the interior surface 22 of the chamber wall 16. As best seen in FIG. 2, the members 60 are spaced apart from one another so as to be arrayed in a field 62 and are arranged in rows 64 extending in lateral directions and spaced apart longitudinally along the field 62. The members 60 are spaced apart laterally from one another and project in altitudinal directions so as to extend transversely into the oncoming stream 38 of material 36. Each member 60 has a generally cup-shaped configuration facing upstream. Thus, the members 60 each have an upstream face 66 for confronting the oncoming stream 38 of material 36, and the upstream face 66 has a leading edge 70, a trailing edge 72 and a concave contour configuration 74 extending between the leading edge 70 and the trailing edge 72 for intercepting the oncoming stream 38, the leading edge 70 being located upstream of the trailing edge 72 such that the oncoming stream 38 is first intercepted by a member 60 adjacent the leading edge 70 of the member 60. Each member 60 has a plan configuration which includes a first leg 80 extending in an essentially longitudinal direction, and a second leg 82 extending in an essentially lateral direction, the first leg 80 being located upstream of the second leg 82 such that each member 60 has an included surface 84 extending along an included angle 86 between the first and second legs 80 and 82 and facing upstream. An opposite surface 90 extends along an external angle 92 facing downstream, and the concave contour configuration 74 extends along the included surface 84.

In the illustrated preferred embodiment of FIGS. 1 and 2, each member 60 has a generally L-shaped plan configuration and the concave contour configuration 74 is curved. Preferably, the included angle 86 is a right angle, with the first and second legs 80 and 82 being perpendicular to one another, and the curved concave contour configuration 74 is semi-circular. The rows 64 of the array 62 of members 60 are staggered laterally so that the members 60 of adjacent rows 64 are spaced laterally from one another. The arrangement and configuration of the members 60 assures that the tendency toward laminar flow of the stream 38 in the channel 42 of the extruder screw 30 is disrupted by the members 60, with the semi-circular concave contour configuration establishing eddies along each member 60. As the material 36 of the stream 38 advances downstream, the material cascades between adjacent members 60 in a row 64 and into an adjacent row 64 of members 60, serving to increase the mixing action without excessive shear of the material 36.

Figure 3:
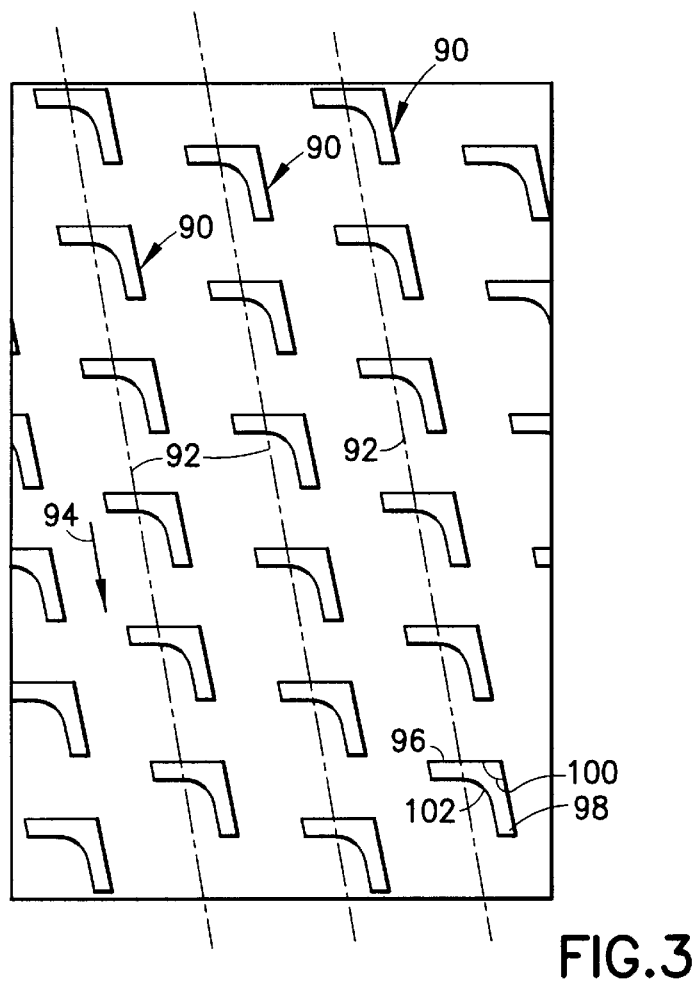
FIG. 3 is a schematic view similar to FIG. 2, and showing an alternate embodiment.

In the embodiment of FIGS. 1 and 2, the members 60 are arrayed in rows 64 which lie in planes P generally normal to the longitudinal axis R and spaced apart longitudinally along axis R. In an alternate arrangement, as seen in FIG. 3, mixing elements in the form of members 90 are arrayed in rows 92 which follow a spiral direction 94. Each member 90 includes a first leg 96 extending in an essentially longitudinal direction, and a second leg 98 which extends laterally along the spiral direction 94. The first and second legs 96 and 98 make an obtuse angle 100 to one another and, as before, an upstream face 102 has a curved contour configuration for confronting an oncoming stream of material.

Figure 4:
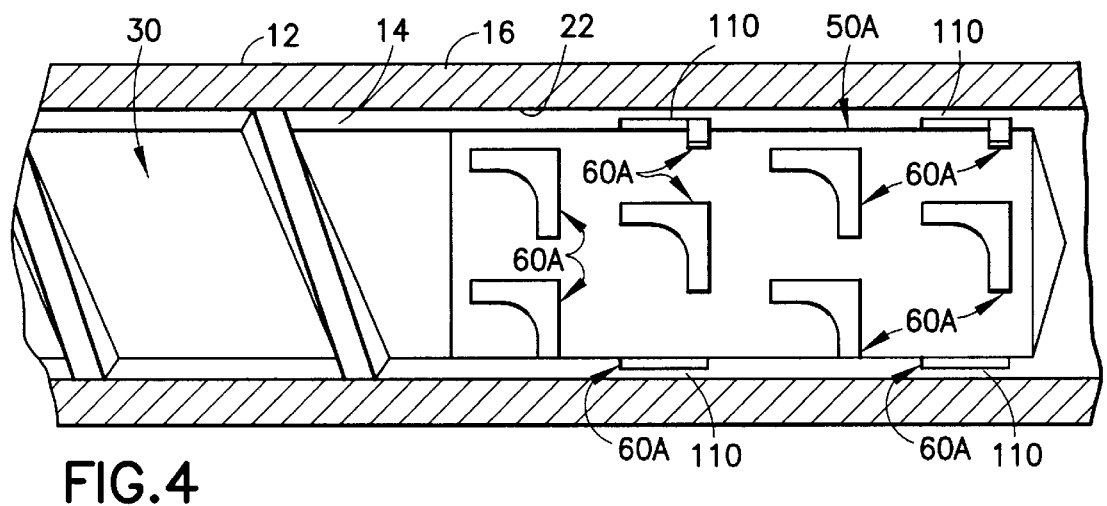
FIG. 4 is a fragmentary cross-sectional view similar to FIG. 1, and showing an alternate embodiment.

Depending upon the viscosity and other properties of the material being subjected to mixing, shear can be reduced further by providing greater amounts of clearance between the members 60 and the interior surface 22 of the chamber wall 16. Thus, as illustrated in FIG. 4, the members 60A of alternate mixing device 50A are spaced radially further from the chamber wall 16 than in the embodiment of FIG. 1, thereby establishing a clearance space 110 providing a clearance distance between members 60A and interior surface 22 of chamber wall 16 which is greater than that illustrated in the embodiment of FIG. 1. In this manner an additional flow path is provided in the form of an additional clearance flow passage over each member 60A so that shear is reduced, while mixing still is enhanced by the turbulent action provided by members 60A.

Figure 5:
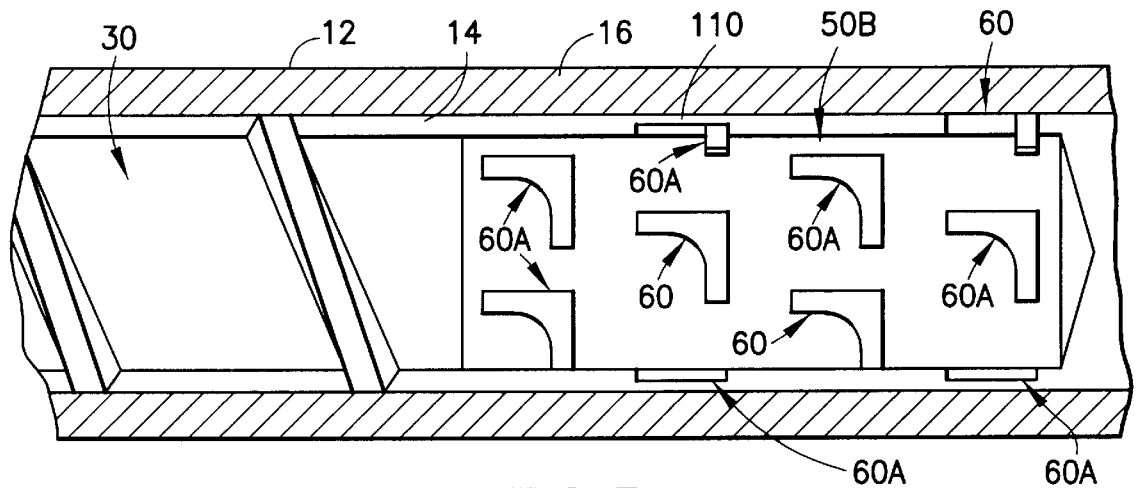
FIG. 5 is a fragmentary cross-sectional view similar to FIG. 4, and showing another alternate embodiment.
Figure 6:
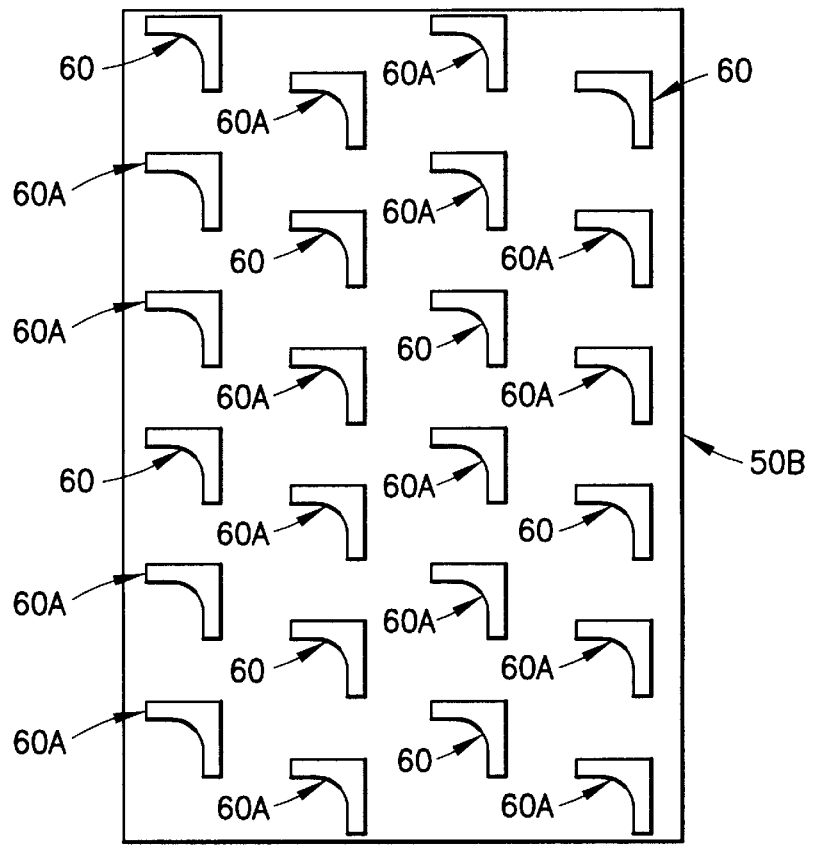
FIG. 6 is a schematic view similar to FIG. 2, and showing the embodiment of FIG. 5.

In the embodiment illustrated in FIGS. 5 and 6, some of the members 60A have been made shorter than the other members 60 of another alternate mixing device 50B so that some additional clearance space 110 is provided for additional clearance flow passages where desired to meet the properties of a particular material being mixed. At the same time, the longer members 60 tend to scrape material from the chamber wall 16 for better mixing.

Figure 7:
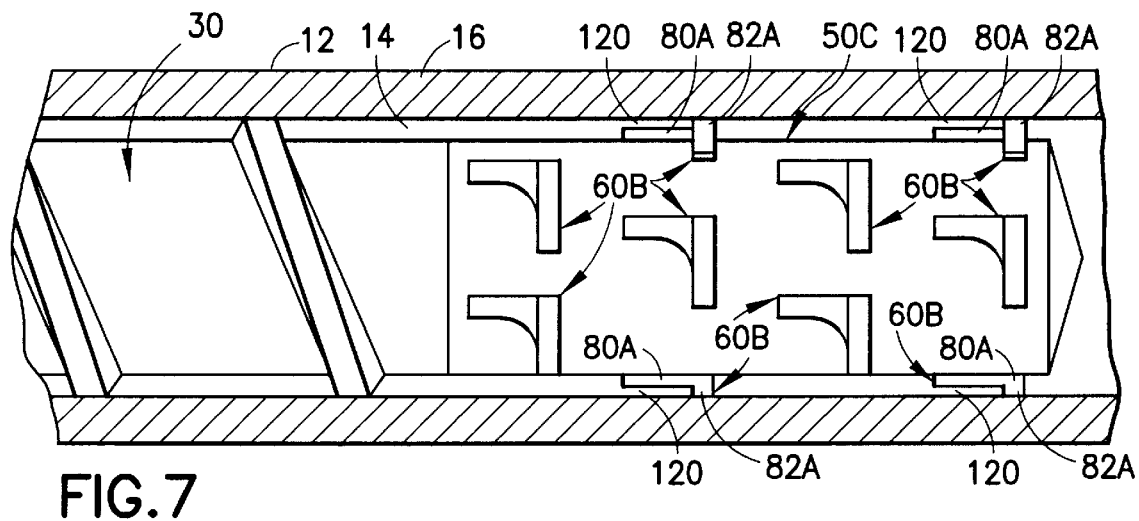
FIG. 7 is a fragmentary cross-sectional view similar to FIG. 4, and showing still another alternate embodiment.
Figure 8:
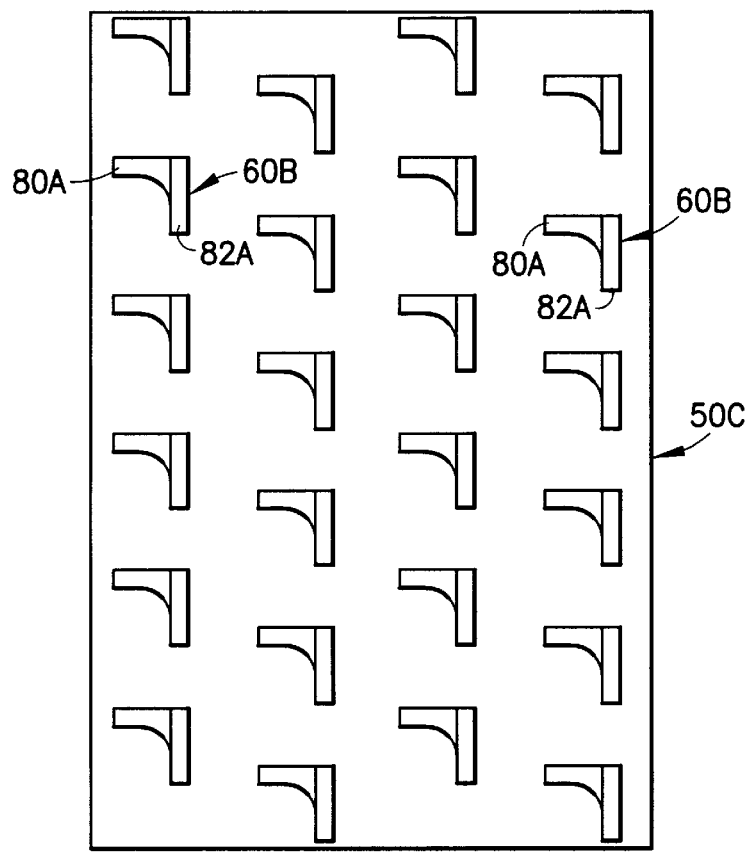
FIG. 8 is a schematic view similar to FIG. 2, and showing the embodiment of FIG. 7.

In the embodiment shown in FIGS. 7 and 8, portions of the mixing elements have been made shorter for providing additional clearance space for additional clearance flow passages. Thus, the first legs 80A of mixing elements in the form of members 60B of alternate mixing device 50C have been shortened radially to provide additional clearance space 120 which establishes a clearance distance for reducing shear, as desired to compensate for properties of a particular material being mixed, while providing enhanced mixing. The radially longer second legs 82A tend to scrape material from the chamber wall 16 for more thorough mixing.

Figure 9:
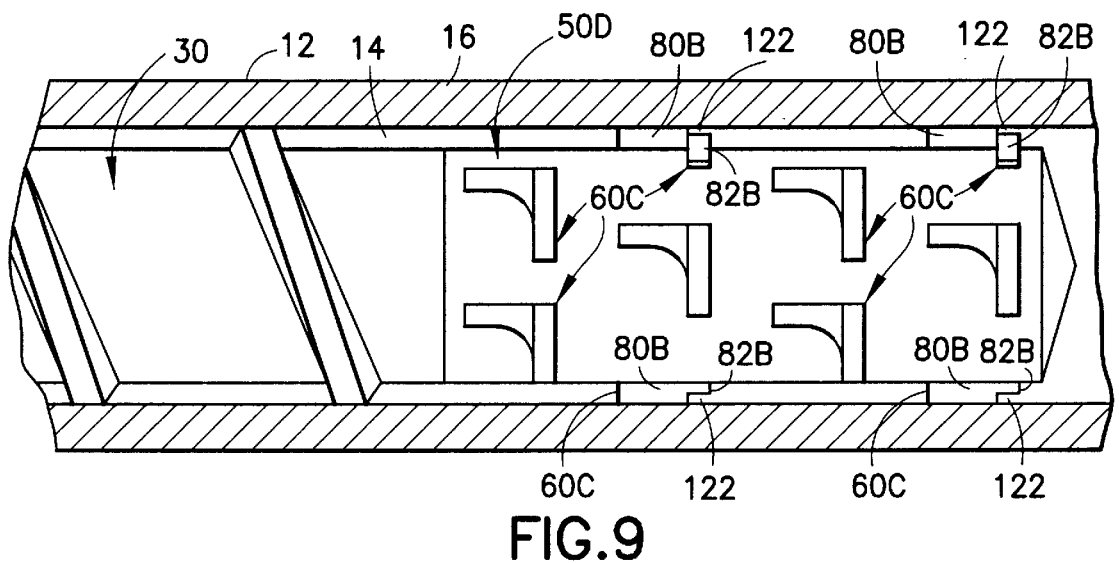
FIG. 9 is a fragmentary cross-sectional view similar to FIG. 4, and showing yet another alternate embodiment.

In the embodiment shown in FIG. 9, shortened portions of the mixing elements are shown at the second legs 82B of mixing elements in the form of members 60C of alternate mixing device 50D, the second legs 82B being shortened radially to provide additional clearance space 122 which establishes a clearance distance for an additional clearance flow passage for reducing shear, as desired to compensate for properties of a particular material being mixed, while providing enhanced mixing. The radially longer first legs 80B tend to scrape material from the chamber wall 16 for more thorough mixing.

Figure 10:
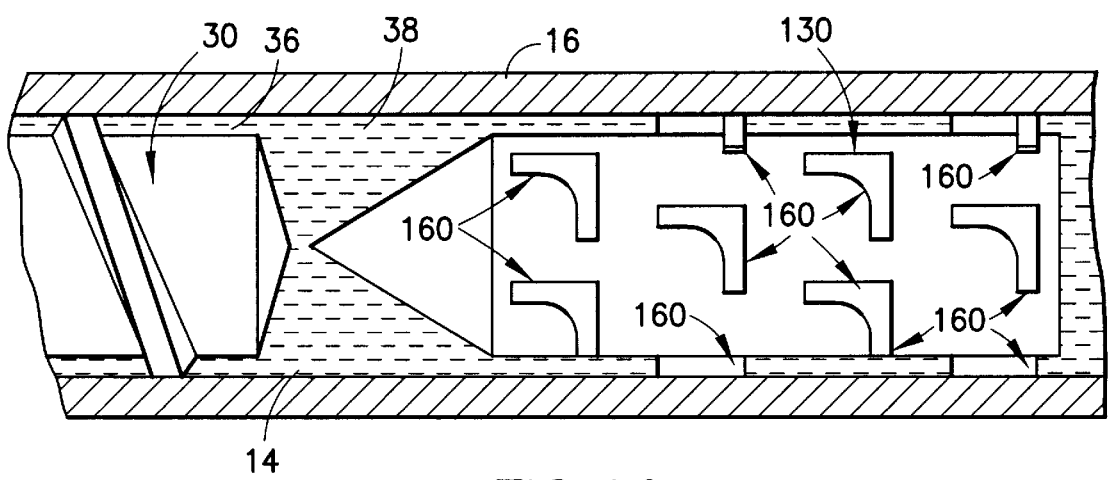
FIG. 10 is a diagrammatic view similar to FIG. 1, and illustrating another embodiment of the invention.

Turning now to FIG. 10, an alternate embodiment is shown in which mixing device 130 is mounted in the chamber 14, independent and downstream of the extruder screw 30. Rather than rotating in the chamber 14, mixing device 130 is fixed in place at a location downstream from the extruder screw 30 and remains static while intercepting the stream 38 of material 36 to effect enhanced mixing in a manner similar to that described above. That is, the mixing elements, shown in the form of members 160, each have a configuration similar to members 60 and the members 160 operate in a manner similar to members 60 to effect enhanced mixing at lower shear.

It will be seen that the present invention attains the several objects and advantages summarized above, namely: Attains effective mixing of constituents in a stream of material without excessive shearing of the material; allows thorough mixing of constituents to be carried out in a stream of material without deleterious degradation of the material in the stream; provides a high degree of turbulence for effective mixing of constituents in a stream of material; enables ready adoption for use in current extrusion and injection molding apparatus, as well as other material transport conduits; provides a simple yet effective mixing device for use in a wide range of mixing applications, in both dynamic and static installations; accomplishes a high degree of mixing effectiveness with a simplified device of rugged construction for reliable use over a long service life.

It is to be understood that the above detailed description of preferred embodiments of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A mixing device for placement at a mixing location in a stream of material for mixing constituents in the stream when the stream of material flows in a longitudinal direction along a conduit from an upstream location to a downstream location, the mixing location being placed in the conduit between the upstream location and the downstream location for intercepting an oncoming stream of material in the conduit, the mixing device comprising:

a plurality of mixing elements spaced apart from one another in a field, the mixing elements being arranged in rows extending in lateral directions and spaced apart longitudinally along the field, the mixing elements of each row being spaced laterally from one another and projecting in altitudinal directions for being located in the conduit to extend transversely into the oncoming stream of material while allowing the stream of material to flow in the longitudinal direction between the laterally spaced apart mixing elements of each row, each mixing element having:

an upstream face for confronting the oncoming stream of material, the upstream face having a leading edge, a trailing edge, and a concave contour configuration extending between the leading edge and the trailing edge for intercepting the oncoming stream, the leading edge being located upstream of the trailing edge such that the oncoming stream is first intercepted adjacent the leading edge; and a plan configuration including a first leg extending in an essentially longitudinal direction, and a second leg extending in an essentially lateral direction, the first leg being located upstream of the second leg such that each element has an included surface extending along an included angle between the first and second legs and facing upstream, and an opposite surface extending along an external angle between the first and second legs and facing downstream, the concave contour configuration extending along the included surface.

2. The mixing device of claim 1 wherein the plan configuration is generally L-shaped.

3. The mixing device of claim 2 wherein the concave contour configuration is curved.

4. The mixing device of claim 1 wherein the rows are staggered laterally so that the mixing elements of adjacent rows are spaced laterally from one another.

5. The mixing device of claim 4 wherein the plan configuration is generally L-shaped.

6. The mixing device of claim 5 wherein the concave contour configuration is curved.

7. The mixing device of claim 1 wherein the included angle is a right angle.

8. The mixing device of claim 1 wherein the included angle is an obtuse angle.

9. The mixing device of claim 1 wherein the conduit includes a longitudinally extending cylindrical chamber having a cylindrical chamber wall, the field of mixing elements is located on a cylindrical basal member mounted for rotation in a prescribed direction of rotation about a longitudinal axis within the cylindrical chamber, and the mixing elements project radially from the cylindrical basal member into the cylindrical chamber toward the cylindrical chamber wall.

10. The mixing device of claim 9 wherein the leading edge of each mixing element leads the trailing edge of each mixing element along the prescribed direction of rotation of the cylindrical basal member.

11. The mixing device of claim 9 wherein portions of at least some of the mixing elements are spaced radially from the cylindrical chamber wall by a clearance distance to establish clearance flow passages between the radially spaced first legs and the cylindrical chamber wall.

12. The mixing device of claim 9 wherein at least one of the first and second legs of at least some of the mixing elements are spaced radially from the cylindrical chamber wall by a clearance distance to establish clearance flow passages between the radially spaced first legs and the cylindrical chamber wall.

13. The mixing device of claim 9 wherein both the first and second legs of at least some of the mixing elements are spaced radially from the cylindrical chamber wall by a clearance distance to establish clearance flow passages between the radially spaced first and second legs and the cylindrical chamber wall.

14. The mixing device of claim 9 wherein the plan configuration is generally L-shaped.

15. The mixing device of claim 14 wherein the concave contour configuration is curved.

16. The mixing device of claim 9 wherein the rows are staggered laterally so that the mixing elements of adjacent rows are spaced laterally from one another.

17. The mixing device of claim 1 wherein the conduit includes a longitudinally extending chamber having a chamber wall, the field of mixing elements is located on a basal member mounted within the chamber, and the mixing elements project from the basal member into the chamber toward the chamber wall.

18. The mixing device of claim 17 wherein portions of at least some of the mixing elements are spaced radially from the cylindrical chamber wall by a clearance distance to establish clearance flow passages between the radially spaced first legs and the cylindrical chamber wall.

19. The mixing device of claim 17 wherein at least one of the first and second legs of at least some of the mixing elements are spaced from the chamber wall by a clearance distance to establish clearance flow passages between the spaced first legs and the chamber wall.

20. The mixing device of claim 17 wherein both the first and second legs of at least some of the mixing elements are spaced from the chamber wall by a clearance distance to establish clearance flow passages between the spaced first and second legs and the chamber wall.

* * * * *